Figure 1:
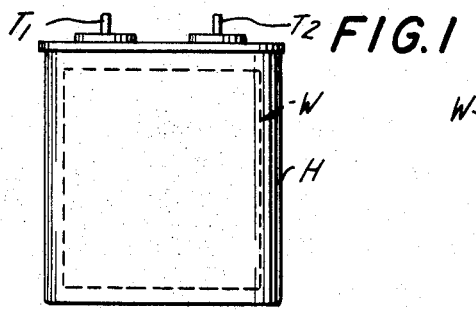

United States Patent

[11] 3,584,272

[72] Inventor Paul S. Martin
 Flushing, N.Y.
[21] Appl. No. 886,223
[22] Filed Dec. 18, 1969
[45] Patented June 8, 1971
[73] Assignee Federal Pacific Electric Company
 Newark, N.J.

[54] IMPREGNATED FILM CAPACITORS
 9 Claims, 6 Drawing Figs.

[52] U.S. Cl. .................................................. 317/260
[51] Int. Cl. .................................................. H01g 3/195
[50] Field of Search ................................... 317/260, 258

[56] References Cited
 UNITED STATES PATENTS
 3,447,048  5/1969  Wurstor ...................... 317/258

Primary Examiner—Elliot A. Goldberg
Attorney—Paul S. Martin

ABSTRACT: A capacitor has a multilayered dielectric. The dielectric has plastic and paper layers. The paper layer separates ends of the plastic layers to prevent the plastic layers from edge sealing.

PATENTED JUN 8 1971 3,584,272

IMPREGNATED FILM CAPACITORS

The present invention relates to electrical capacitors having wound capacitor sections impregnated with dielectric liquid and having strips of synthetic-film dielectrics.

A widely used form of capacitor construction utilizes electrodes made of strips of foil insulated from each other by dielectric separators and wound to form a capacitor section. Each separator incorporates multiple strips of synthetic dielectric film. It has been a common practice to interpose a strip of paper between confronting strips of synthetic film in order to promote thorough penetration of liquid impregnants from the edges of the separators deep into the winding. The paper serves as a wick, in addition to its contribution to the dielectric separation between the electrodes. However, despite the inclusion of the paper strip, random manufacturing variations occur which nevertheless permit an edge of the paper strip to be recessed. This correspondingly allows the edges of the synthetic film strips to touch each other and to inhibit the penetration of the liquid impregnant.

An object of the present invention resides in the provision of a capacitor in which layered dielectric separator strips are used between the electrodes, having multiple strips of synthetic-film dielectric and one or more interposed paper strips, in which the edges of the various strips are staggered to avoid the possibility of edge sealing of multiple film strips in any given dielectric separator. A further object resides in the provision of a novel winding configuration in which the strips of paper and synthetic film forming the dielectric separators and the strips of foil forming the electrodes are related to each other so as to be effectively impregnated. A still further object resides in the provision of novel winding configurations for impregnated capacitors especially effective for promoting thorough impregnation and for realizing certain economies in the amounts of dielectric materials required.

Figure 2:
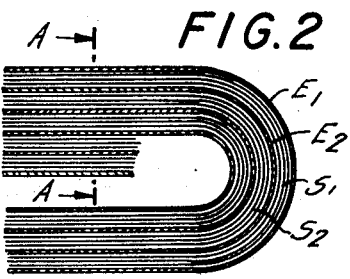

The foregoing and other objects and novel features are realized in various embodiments described in detail below and shown in the accompanying drawing. Briefly, however, successive strips of the dielectric separators between the electrodes of a wound capacitor section have their edges displaced or staggered stepwise so as to expose laterally a marginal portion of each paper strip at both ends of the capacitor section. At each end of the capacitor section, an edge of a film strip at one side of the paper projects beyond the edge of the paper and the edge of the film strip at the other side of the paper strip is recessed relative to the edge of the paper strip. This configuration applies to a single dielectric separator only; but it is a configuration that is repeated with mirror symmetry at opposite sides of the strips of foil that form the electrodes. Those relationships of the paper and the film maintain the exposure of the paper-strip margins to the liquid impregnant, in a winding configuration that can utilize strips of paper and film that are of equal widths, further realizing some economies in the dielectric materials needed in the end portions of the wound capacitor section. The nature of the invention and its further objects, features and advantages will be better understood from the following description in detail of the illustrative embodiments which are shown in the accompanying drawings. In the drawings:

FIG. 1 is a side view of a capacitor including a sealed metal container enclosing a wound capacitor section;

FIG. 2 diagrammatically represents an end view of an elemental portion of the wound capacitor section in the capacitor of FIG. 1; and FIGS. 3, 4, 5, and 6 are diagrammatic cross-sectional illustrations of three different wound capacitor sections as viewed at the plane A-A of FIG. 2.

In FIG. 1 a complete capacitor is shown including a housing H commonly of drawn sheet metal and with a sealed cover containing a wound capacitor section W having terminals T1 and T2 connected to the respective electrodes of the capacitor section W. The whole unit is ordinarily sealed hermetically after having been subjected to a protracted impregnation procedure during which the capacitor section W is evacuated and dried to eliminate air and moisture, then filled and impregnated with a dielectric liquid that is intended to fill the voids within the wound section and to immerse the wound section in the housing H. In order for the capacitor to perform at a high voltage rating (relative to the thickness of the dielectric separators between the electrodes of the winding) it is important for the voids to be occupied by the impregnating liquid, and therefore thorough impregnation is important.

FIG. 2 is a diagrammatic end view of an elemental portion of wound capacitor section W. The capacitor section includes electrodes E1 and E2, each ordinarily being a strip of thin foil as of aluminum. The successive foils are spaced from each other by dielectric separators S1 and S2. The capacitor section is wound reasonably tight consistent with avoiding wrinkles and the like, so that the successive strips forming the winding are in surface contact with each other to the extent of the common confronting areas of each strip and the next.

FIGS. 3, 4, 5, and 6 represent different forms of wound capacitor sections that illustrate various features of the invention. In those figures, metal foil is represented by a double line with cross-hatching, strips of synthetic film are represented by single lines and strips of paper are represented by wavy lines. The extremities of the lines in all instances represent the edges of the various strips that make up the wound capacitor section W.

Figure 3:
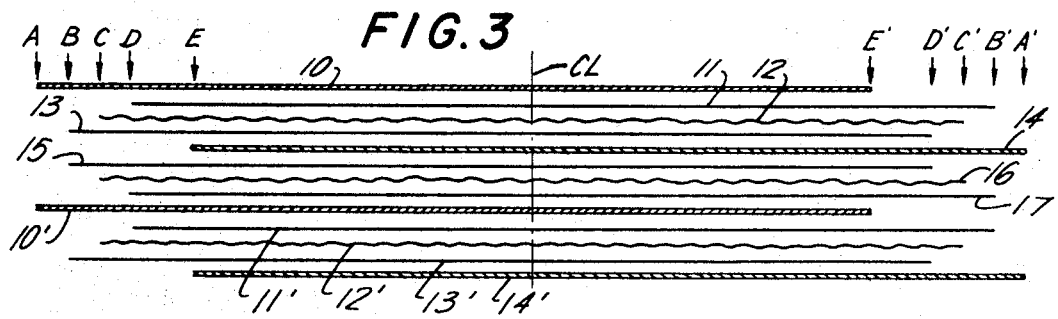

The capacitor section represented in FIG. 3 includes a strip 10 of foil as of aluminum forming one electrode of the capacitor section (electrode E1 in FIG. 2) and another strip 14 of foil as of aluminum forming the other electrode of the capacitor section (electrode E2 of FIG. 2). Parts 10 and 10' represent successive convolutions of one electrode and parts 14 and 14' represent successive convolutions of the other electrode.

In FIG. 3, the dielectric separator S1 of FIG. 2 comprises a pair of strips of synthetic plastic film 11 and 13 with an interposed strip 12 of capacitor-grade kraft paper. In FIG. 3, the dielectric separator S2 of FIG. 2 comprises a pair of strips of synthetic plastic film 15 and 17 with an interposed strip 16 of capacitor-grade kraft paper. Strips 11', 12' and 13' represent an inner convolution of dielectric separator 11, 12, 13.

The capacitor section of FIG. 3 generally represents the well-known extended foil construction. Thus, electrode 10, 10' involves a strip of foil whose left-hand edge projects beyond the edges of the dielectric separators which in turn project beyond the left-hand most-recessed edge of foil electrode 14, 14'; and likewise the right-hand edge of foil strip 10, 10' is more recessed than dielectric separators 11, 12, 13 and 14, 15, 16, and the right-hand edge of foil strip 14, 14' is extended beyond separators 11, 12, 13 and 15, 16, 17.

The configuration of FIG. 3 may be considered in further detail by examining the left-hand side only of the drawing. At the top of the drawing letters A, B, C and D are locations at which edges of the various strips are located. In practice, points A, B, C and D are separated by ⅛-inch intervals, for example, and points D and E are separated by ¼ inch. (Correspondingly, points A', B', C', D', E' at the right-hand extremity of the wound section have the same significance and relationship.) In the description reference is made to the centerline CL or center which is midway between the ends of the capacitor section. The edge of so-called "extended" foil 10 at point A extends farthest from the center CL of the capacitor section. The edge of paper 12 at point C is recessed less than the edge of film 11 adjacent to the lower surface of foil 10 and more than the edge of film 13 which is spaced away from foil 10. The same description applies also to the upper surface of foil 10, 10'. Thus strip of paper 16 is recessed less than strip of film 17 which is closest to the upper surface of foil 10' and more than the edge of film strip 15 that is spaced from the upper surface of foil 10'. The next convolution of dielectric separator 11', 12', 13' has the identical relationship to the lower surface of foil convolution 10' as that described for dielectric separator 11, 12, 13 in relation to the lower face of foil strip 10. Still further, the edges of the various strips above and below convolution 10' of foil are arranged in mirror symmetry to each other, the edges of film strips 17 and 11' being recessed the most, the edges of paper strips 16 and 12' are recessed somewhat less, and the edges of film strips 15 and 13' are recessed least.

The left-hand edge of foil strip 14 is located at point E so as to be recessed substantially inward of point D.

The edges of the successive strips 11, 12 and 13 of one dielectric separator at the top of foil strip 14 are arranged in mirror symmetry to the left-hand edges of strips 15, 16 and 17 at the bottom of foil strip 14. In this instance, the most-recessed left-hand edge of convolution 14 has film strips adjacent to it (above and below) and those adjacent strips extend farther from the center CL of the wound section than the edges of paper strips 12 and 16. In turn, the film strips 11 and 17 which are spaced from foil 14 are recessed more than the other dielectric strips.

To the left of point E (the edge of foil convolution 14) there is a full thickness of the dielectric material in the separator between foil strips 10 and 14, involving all three layers 11, 12 and 13. This full thickness is available to resist the potential gradient between the foil electrodes through the dielectric separator. Film 13 extends beyond the edge of recessed foil convolution 14 by a distance B-E which provides appropriate creepage distance from foil convolution 14 to foil convolution 10. Thus, the dielectric separator with its staggered edges provides the requisite dielectric thickness and the requisite end creepage distance, and yet there is an appreciable economy of material used. At this end of the capacitor section, the paper is narrower by space B, C and the film 11 is narrower by space B, D than would be the case were all three layers aligned and located at the edge position B to provide the required end creepage distance. This represents an appreciable saving of dielectric material. Additionally, a smaller amount of dielectric material being used in the end structure is of advantage in improving the heat dissipation of the section. The paper and film strips are of relatively poor heat conductivity. The dielectric material in the end structure between the bulk of the wound capacitor section and the end surface of the capacitor section tends to inhibit heat dissipation at the ends of the capacitor section. Reduction in the amount of dielectric material in the end structure of the capacitor section thus tends to improve endwise dissipation of heat from the section. Most important, however, is the fact that the staggered sequential edges of film 13, paper 12 and film 11 provide a marginal exposed surface of paper strip 12 for access to impregnating fluid that enters the wound section from the left. With that winding configuration, there is no possibility of the edges of strips 11 and 13 touching each other in a way that might bar access of the impregnating fluid to the margin of paper strip 12. In the winding configuration described there is a margin of the paper strip exposed to the impregnating liquid, to act as a wick for conveying impregnant by bicapillary action to the center of the wound capacitor section. The same properties are true of the second dielectric spacer comprising strips 15, 16 and 17. The marginal portions of strips 13 and 15 might touch foil convolutions 10 and 10' respectively but such contact is neither continuous nor does it tend to form a seal against penetration of the impregnating liquid.

Of incidental interest is the space leftward of the left-hand margin of foil convolution 14, between film strips 13 and 15. During the evacuation process, this space (½-inch wide in a practical example) is easily pumped free of air and surface moisture. This space is not directly between the electrodes and therefore the field gradient endwise of convolution 14 may not be critical. In any case, for many impregnants and many synthetic plastic films, the impregnant that reaches film strips 13 and 15 via paper strips 12 and 16 can swell films 13 and 15 and penetrate any voids between them that were present before impregnation. Polypropylene is one such film that is swelled and thus penetrated by mineral oil and by chlorinated hydrocarbons such as chlorinated diphenyl alone and with trichlorobenzene. Swelling of polypropylene film in mineral oil is reported in "Forms, Properties, and Applications of Electrical Grade Polypropylene Films" by Robert L. Wibbens, in "Insulation", July 1964, pages 46—49. Other films and impregnants having similar properties are mentioned in U.S. Pat. No. 2,935,668 Robinson et al. In any case, should the space between confronting films 13 and 15 at the margin of foil 14 prove troublesome with particular films and/or impregnants, then a spacing strip of paper or the like can be interposed as discussed more fully below in connection with FIG. 5.

All of the strips making up the dielectric separators 11, 12, 13 and 15, 16, 17 are of the same width, within manufacturing tolerances and variations. As a result the edges of strips 11, 12, 13, 15, 16 and 17 have the same relationship to the extended margin of foil convolution 14 at the right-hand end of the capacitor section as was described above in connection with the film and paper strips whose left-hand edges are staggered in relation to the extended-foil margin of foil convolution 10'. Film strips 13 and 15 closest to foil convolution 14 have edges from the right-hand edge of convolution 14, the edges of paper strips 12 and 16 are closer to the right-hand edge of foil convolution 14, and the strips 11 and 17 that are spaced from foil convolution 14 have their right-hand edges still closer to the right-hand edge of foil convolution 14. This is the mirror image configuration of the edges of the strips that was described above in describing the relationship of the dielectric strips to the left-hand edge of extended-foil convolution 10'.

The reverse mirror-image configuration obtains for the right-hand edges of the strips comprising separators 15, 16, 17 and 11', 12', 13' at the opposite surfaces of foil convolution 10' at the right-hand recessed edge of that foil convolution. Thus, all of the edge relationships and advantages exist at the right-hand end of the wound capacitor section in FIG. 3 as those which have been described for the left-hand end of the wound capacitor section, a consequence of making all the dielectric strips of equal width. The construction assures an available marginal area of each paper strip for access by the impregnating fluid at the ends of the capacitor section. The capacitor section also provides the requisite dielectric separation between the electrodes while realizing some economy of the materials used and an improvement in heat dissipation via the end of the capacitor section.

Figure 4:
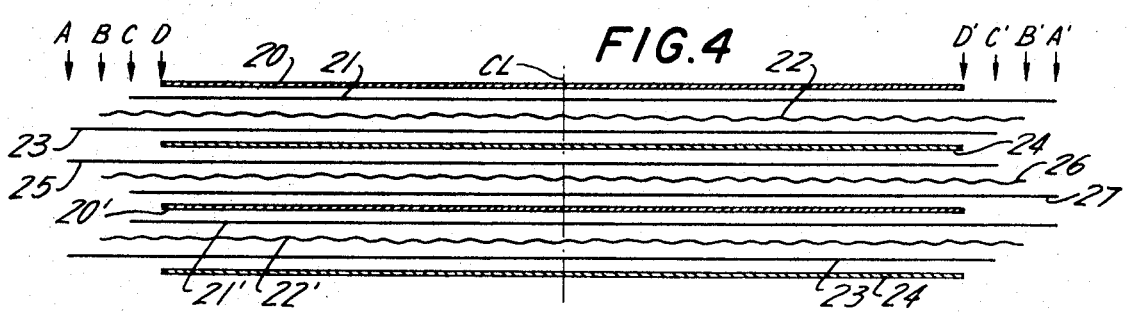

Much of what has been said above in connection with FIG. 3 that applies to the extended-foil type of wound capacitor section also applies to inductive wound sections where both longitudinal edges of each foil electrode are recessed. Such a construction is shown in FIG. 4. At the left-hand end of the capacitor section, the edge of foil convolution 20 is at point D, the edge of film strip 21 is at point C, the edge of paper strip 22 is at point B, and the edge of film strip 23 is at point A. In relation to foil convolution 20, the edges of strips 21, 22 and 23 are progressively farther away. This same statement is true for the edges of both groups of strips making up the dielectric separators above and below foil convolution 20'. Above and below convolution 24 at the left-hand end of the winding, film strips 23 and 25 confront each other. However, that space is readily evacuated and it is readily occupied by swelling and impregnation of dielectric fluid that penetrates those film strips from the paper strips 22 and 26 whose margins are exposed for free penetration by the liquid impregnant. Correspondingly, there are narrow areas of film strips 27 and 21' that confront each other at the left-hand edge of foil convolution 20'; but that region should not cause trouble both because it is easily evacuated and because it may be expected to be impregnated effectively or filled by swelling.

Figure 5:
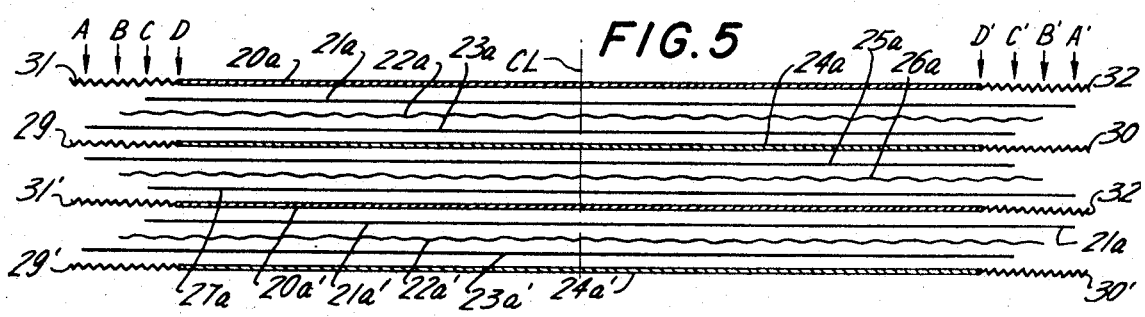

In the event that the confronting areas of film adjacent the margins of the foil strips should prove troublesome, paper spacers may be inserted in the form of narrow strips that are aligned edgewise with the foil strips during winding. Such a configuration is shown in FIG. 5 in which electrodes and dielectric strips appear having the same configuration as that in FIG. 4 but in which marginal spacers are added. The various convolutions of electrode and dielectric strips in FIG. 4 are repeated in FIG. 5 with numerals having the suffix "a," and their description is unnecessary. In FIG. 5 strips 29 and 30 are wound in the spaces between film strips 23a and 15a, along the longitudinal edges of foil strip 24a. Strips 29 and 30 are at least as wide as, and preferably wider than, the space between the edges of the foil strip and the edges of the film strips. These spaces are thus readily evacuated and impregnated. Still further, paper strips 31 and 32 are aligned with the longitudinal edges of foil strip 20a so that, for convolution 20a', the convolution 31' of paper strip 31 is interposed between the confronting margins of film strips 27a and 21a' above and below foil convolution 20a'. Thus the margins of film strips 27a and 21a' are readily impregnated and the voids that may be there before impregnation are easily filled. If there were any risk of the confronting margins of film strips 25a, 23a' touching each other and blocking entry of the impregnating fluid, strips 31' and 32' would guard against that occurrence.

In common with the construction of FIG. 3, the progressively staggered strips that make up the dielectric separators in FIGS. 4 and 5 insures lateral exposure of a marginal surface of each paper strip along each of its longitudinal edges for entry of impregnating fluid. Also in common with FIG. 3, the dielectric separators in FIGS. 4 and 5 are made up of strips of film and of paper that are of equal widths. The dielectric strength through the dielectric spacer is ample, and the creepage distance around the edges of the dielectric separators is also ample, and yet there is a saving in the required width of the film strips and paper strips that make up the dielectric separators.

Figure 6:
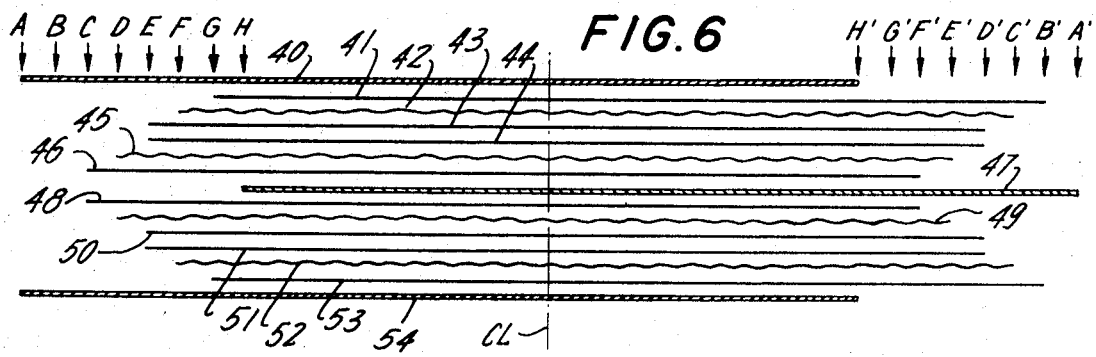

In each of the examples represented in FIGS. 3, 4 and 5, the elemental dielectric separator includes two strips of synthetic polymer film separated by a strip of paper, the edges of the strips being staggered by progressive steps. The staggering of the steps follows a pattern of mirror symmetry at the opposite surfaces of any one convolution of foil. In the embodiment of FIG. 6, the number of strips in each dielectric separator is doubled and the staggering of each film-paper-film sequence is the same in FIG. 6 as that in FIGS. 3, 4 and 5. In FIG. 6, one dielectric separator includes in sequence strips of film 41, paper 42, film 43, film 44, paper 45 and film 46, and the other dielectric separator includes in sequence strips of film 48, paper 49, film 50, film 51, paper 52 and film 53. In each three-strip sequence 41–42–43, 44–45–46, 48–49–50 and 51–52–53 the edge staggering is the same as that of strips 11–12–13 for example. In FIG. 6 each separator has two confronting strips of film 43–44 and 50–51 whose edges are, or may be, aligned. This is because the liquid impregnant is distributed by the paper strips over the confronting areas of the film and paper strips, and the impregnant can penetrate from the paper side of each of such face-to-face contacting films to the film-to-film interfaces, for suitably chosen impregnants and films. Were the impregnant incapable of penetrating through the film that is used, then, of course, a regular staggering pattern in FIG. 6 should be used as that in FIGS. 3, 4 and 5, and a strip of paper should be interposed between each strip of film and the next in the capacitor section. The edges of strips of film 43 and 44 would then be staggered and separated by a strip of paper and likewise film strips 50 and 51 would be separated by a paper strip with the described staggered relationship at the edges.

The construction in FIG. 6 involves an extended-foil type of capacitor winding as is represented in FIG. 3. It is apparent that the dielectric separators of FIGS. 4 and 5 may be enlarged to include additional strips of film and paper as represented in FIG. 6. Furthermore, the use of bands of paper 29, 30, 31 and 32 as illustrated in FIG. 5 can be employed where warranted along the recessed margins of the foil electrodes between confronting marginal areas of the film strips in the other winding configurations.

While only a few embodiments of the invention have been shown and described in detail it will be recognized by those skilled in the art that various changes and modifications may be made herein without departing from the spirit and scope of the invention.

What I claim is:

1. A capacitor including first and second strips of foil and first and second dielectric separators between said strips of foil wound together as a capacitor section with the edges of said strips of foil and of said separators forming end portions of the capacitor section, said capacitor section having a liquid impregnant, each of said dielectric separators comprising a first strip of synthetic film, a strip of paper and a second strip of synthetic film as successive layers in the sequence named, the edges of the successive edges of the successive strips in each dielectric separator being staggered such that, in each end portion of the capacitor section, the edge of the strip of paper is closer to center of the capacitor section midway between the end portions of the capacitor section than the edge of one of said strips of synthetic film and farther from said center than the edge of the other of said strips of synthetic film, said paper thereby preventing face-to-face contact between the edge portions of said first and second strips of film of each of said separators at each end of the capacitor section.

2. A capacitor in accordance with claim 1 wherein said strips of film and paper are of substantially equal widths.

3. A capacitor in accordance with claim 1 wherein the edges of said strips of said second dielectric separator in at least one end portion of the capacitor section and at one face of a given strip of foil are staggered in mirror-image symmetry in relation to the edges of said strips of said first dielectric separator at the opposite face of said given strip of foil.

4. A capacitor in accordance with claim 1 wherein said strips of film and paper are of substantially equal widths and wherein, in each end portion of the capacitor section, the edges of said strips of said second dielectric separator are staggered in mirror-image symmetry to corresponding edges of said strips of said first dielectric separator.

5. A capacitor in accordance with claim 1 wherein each of said strips of foil has one edge extending beyond the dielectric separators in a respective end portion of said capacitor section and wherein each of said strips of foil has its other edge recessed relative to said dielectric separators at the other end, respectively, of said capacitor section, the extending edge of a given strip of foil being farther from the edge of the strip of film next to the given strip of foil that it is from the edge of the strip of film spaced from the given strip of foil.

6. A capacitor in accordance with claim 1 wherein said strips of foil have their edges aligned with each other and are recessed relative to all of the edges of said dielectric spacers, the edges of the strips comprising said dielectric separators being staggered progressively in mirror-image symmetry at opposite sides of each of said strips of foil.

7. A capacitor in accordance with claim 6 wherein said strips of film and paper are of substantially equal widths.

8. A capacitor in accordance with claim 6 wherein the strips of film adjacent to the opposite surfaces of one of said strips of foil are recessed more than the edges of the strips of paper in the dielectric separators at opposite sides of said one of said strips of foil and the edges of the last-mentioned strips of paper are recessed more than the edges of other strips of film at opposite surfaces of said one strip of foil, further including a spacing strip of paper aligned edgewise with said edge of said one strip of foil, said spacing strip of paper extending at least as far from the center of the capacitor section as the edges of said other strips of film.

9. A capacitor in accordance with claim 1 wherein at least one edge of each of said strips of foil is recessed relative to the dielectric separators at the opposite sides thereof so that strips of film at opposite sides of said edge of said foil confront each other beyond the recessed foil edge, and a spacing strip of paper aligned edgewise with said recessed foil edge, said spacing strip of paper extending from said foil edge at least as far as the farthest-extending film strips of said dielectric separators.